United States Patent [19]

Duff

[11] 3,949,144

[45] Apr. 6, 1976

[54] REINFORCED CONCRETE CONSTRUCTION

[76] Inventor: Raymond A. Duff, 1333 S. Baker, Santa Ana, Calif. 92707

[22] Filed: Dec. 20, 1971

[21] Appl. No.: 209,888

Related U.S. Application Data

[63] Continuation-in-part of Ser. No. 851,960, Aug. 21, 1969, abandoned, and a continuation-in-part of Ser. No. 123,221, March 11, 1971, Pat. No. 3,753,849.

[52] U.S. Cl. ............... 428/414; 52/309; 52/600; 428/413; 428/454; 428/539
[51] Int. Cl.² ............... B32B 17/10; B32B 27/38
[58] Field of Search ............. 161/185, 93, 162, 159, 161/161; 260/29.2 EP; 52/309, 600; 428/414, 321, 322, 454, 446, 539, 413

[56] References Cited
UNITED STATES PATENTS

| | | | |
|---|---|---|---|
| 2,850,890 | 9/1958 | Rubenstein | 264/228 |
| 2,860,160 | 11/1958 | Sundberg et al. | 106/90 |
| 2,951,001 | 8/1960 | Rubensetin | 161/185 |
| 3,198,758 | 8/1965 | Donnelly | 106/97 |
| 3,203,849 | 8/1965 | Katz et al. | 161/96 |
| 3,240,736 | 3/1966 | Beckwith | 260/29.2 EP |
| 3,310,511 | 3/1967 | Reinert | 260/29.2 EP |
| 3,340,115 | 9/1967 | Rubenstein | 264/228 |
| 3,344,011 | 9/1967 | Goozner | 161/184 |
| 3,450,594 | 6/1969 | Hennessy | 161/184 |
| 3,475,265 | 10/1969 | Santry | 161/162 |
| 3,477,979 | 11/1969 | Hillyer | 260/29.2 EP |
| 3,634,169 | 1/1972 | Garnish | 161/185 |
| 3,666,615 | 5/1972 | Iwai et al. | 161/185 |
| 3,674,533 | 7/1972 | Matsubara et al. | 161/162 |
| 3,753,849 | 8/1973 | Duff | 161/162 |

*Primary Examiner*—William J. Van Balen
*Attorney, Agent, or Firm*—Dean Sandford

[57] ABSTRACT

A reinforced concrete construction formed of a plurality of alternate, integrally bonded layers of epoxy resin-containing concrete and fiber-reinforced epoxy resin. The epoxy resin-containing concrete is a hardened mixture of hydraulic cement, aggregate, water in an amount sufficient to harden the cement, and a minor proportion of epoxy resin. Optionally, short pieces of epoxy resin coated glass fiber can be dispersed within the epoxy resin-containing concrete. The construction can be formed into a relatively thin-walled, laminated article of any desired size and configuration. Also disclosed is a method for fabricating the constructions of this invention.

15 Claims, 3 Drawing Figures

INVENTOR.
RAYMOND A. DUFF
BY Dean Sandford
ATTORNEY

REINFORCED CONCRETE CONSTRUCTION

This is a continuation-in-part of applications Ser. No. 851,960 filed Aug. 21, 1969, now abandoned, and Ser. No. 123,221 filed Mar. 11, 1971 now issued as U.S. Pat. No. 3,753,849.

This invention relates to reinforced concrete constructions, and particularly to relatively thin-walled, laminated articles of construction.

Because of its relatively low cost, durability, high compressive strength, and availability, reinforced concrete has been widely used as a material of construction. However, since concrete has relatively low tensile and flexural strengths, it has not been practical to construct relatively thin-walled, high strengthh articles of concrete, or to construct panels, sheets and similar constructions of concrete. On the contrary, reinforced concrete has been largely limited to use in constructions where weight and bulk are not limiting factors. In contrast, various resin and fiber-reinforced resin systems, such as glass fiber reinforced polyester resin, and the like, have been widely employed to construct a variety of relatively light weight molded and formed articles. These resin constructions are favored for their low weight, ease of fabrication and decorative effect. However, they are subject generally to high cost, flamability, low strength, and limited service life at elevated temperatures or when exposed to light, particularly ultra-violet light. Thus, need exists for a relatively low cost, durable, high strength material of construction that is easy to form and exhibits good thermal properties.

Accordingly, a principal object of this invention is to provide relatively thin-walled constructions having high strength and durability.

Another object of this invention is to provide concrete articles of construction having high strength and durability.

Still another object of this invention is to provide concrete sheet and panel constructions.

A further object of this invention is to provide specially shaped articles of construction having high strength and durability.

The manner in which the foregoing and other objects of this invention are realized will be apparent to those skilled in the art from the specification and claims considered together with the accompanying drawings, in which:

Briefly, this invention contemplates a reinforced concrete construction comprised of a plurality of alternate, integrally bonded layers of epoxy-resin containing concrete and fiber-reinforced epoxy resin. The epoxy resin-containing concrete is a hardened mixture of hydraulic cement, aggregate, water in an amount sufficient to harden the cement, and a minor proportion of epoxy resin. Short pieces of epoxy resin coated chopped glass fibers can be dispersed in the concrete. The construction comprises a relatively thin-walled, laminated article of any desired size and configuration.

Figure 1:
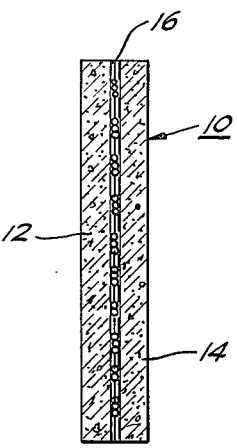
FIG. 1 is a cross-sectional view of a construction of this invention.

Referring to FIG. 1 of the drawings, the numeral 10 designates a construction such as a flat sheet or panel of relatively thin construction. The construction is a laminated structure comprised of two outer layers of epoxy resin-containing concrete 12 and 14 and an inner layer 16 of fiber-reinforced epoxy resin bonding the concrete into an integral unitary structure having high strength and durability. The finished construction can vary from about 1/8 inch to several inches or more in thickness; however, an overall thickness of about 1/4 inch to about 2 inches or more is preferred in many applications, with thicknesses of from about 1/4 inch to 1 inch being especially preferred.

Figure 2:
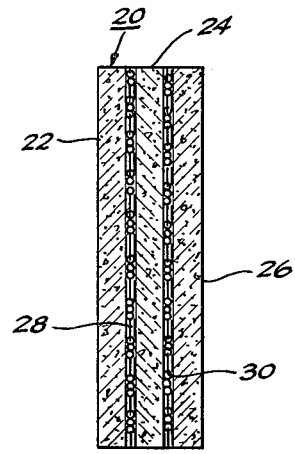
FIG. 2 is a cross-sectional view of another embodiment of a construction of this invention.

FIG. 2 illustrates a construction 20 formed of a plurality of layers of epoxy resin-containing concrete with intermediate layers of fiber-reinforced epoxy resin integrally bonded therebetween to provide a unitary structure. In the illustrated embodiment, the integral structure is formed of three layers of epoxy resin-containing concrete 22, 24 and 26 with a layer of fiber-reinforced epoxy resin 28 interposed between adjacent concrete layers 22 and 24, and a layer of fiber-reinforced epoxy resin 30 interposed between adjacent concrete layers 24 and 26. With this mode of construction, a member can be formed with as many alternate layers of epoxy resin-containing concrete and fiber-reinforced epoxy resin as desired. Constructions having substantial thickness and exhibiting high strength can be formed in this manner.

The epoxy resin-containing concrete employed in the constructions of this invention is a hardened mixture of hydraulic cement, aggregate, sufficient water to hydrate the cement, and a minor proportion of epoxy resin. When first admixed, the material has a soft, semi-solid consistency and can be molded, cast, trowelled or applied by gun. On curing, the material hardens into a hard, rigid solid having strength and durability.

The hydraulic cement can be any of the commercial hydraulic cements such as ASTM Type I or normal Portland cement, ASTM Type II or modified Portland cement, ASTM Type III of high-early-strength Portland cement, ASTM Type IV or low-heat Portland cement, ASTM Type V or sulphate resistant Portland cement, ASTM Type IP or Portland-pozzolana cement, plastic cement, or gun plastic cement. Also, the cement can optionally contain additives to improve various properties, such as workability, aggregate aggregation, air entrainment, and to accelerate or slow setting time. The aggregate is sand, although fine pea gravel and crushed aggregate can be used in part, particularly in thicker constructions. Light weight aggregate can be utilized where a low density product is desired.

Various commercial epoxy resin compositions can be employed in the practice of this invention. These are typically undiluted low viscosity liquids or more viscous resins diluted with a solvent and more conventionally employed in a two component system, i.e., the resin and the catalyst are separately packaged and admixed only at the time of use. The epoxy resins preferred in the practice of this invention are low viscosity, undiluted liquids that exhibit the following properties after curing for seven days:

| | |
|---|---|
| Tensile strength | 8,000 psi minimum |
| Tensile elongation | 10 percent maximum |
| Flexural strength | 15,000 psi minimum |
| Compressive yield | 12,000 psi minimum |
| Hardness | above 60 Shore D |

A commercial epoxy resin exhibiting the foregoing properties and which is particularly useful in the practice of this invention is a two component epoxy resin marketed by the Adhesive Engineering Company under the trademark Concresive No. 1170, and identified as Part A and Part B. This material is admixed in the ratio of about 2 parts of Part A to 3 parts of Part B to about 3 parts of Part A to 2 parts of Part B, and is preferably employed in the proportion of about equal parts of Part A and Part B. Preferably, the two epoxy resin components are intimately admixed prior to adding them to the wet cement mixture.

A suitable epoxy resin is the diglycidyl ether of bisphenol A which can be formed by the condensation of epichlorohydrin and bisphenol A, i.e., bis(4-hydroxyphenyl)dimethyl methane. A preferred bisphenol A diglycidyl ether is a liquid thermosetting resin having a Brookfield viscosity of about 10,000 to 16,000 centipoises at a temperature of 25° C. and an epoxide equivalent weight of about 185 to 200. A suitable bisphenol A diglycidyl ether of this type is marketed by the Celanese Coating Company under the trademark Epi-Rez 510.

The bisphenol A diglycidyl ether can be admixed with a reactive diluent to provide a modified resin system. A preferred epoxy resin is an admixture of bisphenol A diglycidyl ether and ortho-cresyl glycidyl ether containing about 20 to 40 percent of the reactive diluent. A particularly preferred resin combination is an admixture of about 73 parts of bisphenol A diglycidyl ether and 27 parts of ortho-cresyl glycidyl ether. A suitable orthocresyl glycidyl ether reactive diluent having a Brookfield viscosity of 5 to 25 centipoises at 25° C. and an epoxide equivalent weight of 180 to 200 is marketed by the Celanese Coatings Company under the trademark Epi-Rez 5011. A commercially available admixture of 73 percent diglycidyl ether of bisphenol A and 27 percent ortho-cresyl glycidyl ether suitable for use in the compositions of this invention is marketed by the Celanese Coatings Company under the trademark Epi-Rez 5077. This resin mixture has a Brookfield viscosity of 500 to 700 centipoises at 25° C. and an epoxide equivalent weight of 185 to 200.

A wide variety of catalysts and reactive hardeners are known that cure or harden epoxy resins. While a number of different agents can be employed to cure the epoxy resins employed in the compositions of this invention, the reactive amine-type hardeners are preferred. A particularly preferred hardener is an admixture of a reactive amido-amine such as dicyandiamide and a highly reactive modified amine converter. A suitable hardening agent of this type is marketed by the Celanese Coatings Company under the trademark Epi-Cure 872. The preferred hardening agent is added to the epoxy resin in the proportions of about 0.3 to 1 part of hardening agent per part of resin, and preferably in the proportion of about 0.5 part of hardener per part of resin.

The cementitious compositions of this invention are prepared by admixing the ingredients in the proportion of about ¼ to 3, and preferably about ¼ to 1½ gallons of combined epoxy resin and hardener, about 1 to 3 cubic feet of aggregate, and about 4 to 6, and preferably about 4½ to 5 gallons of water per 94 pound sack of cement. A preferred composition comprises an admixture of about ¾ gallon of epoxy resin and hardener, about 2 cubic feet of aggregate, and about 4 to 6 gallons of water per 94 pound sack of cement, the exact amount of water depending upon the moisture content of the sand. The aggregate content of this composition on a weight basis is about 100 to 300 pounds, and preferably about 200 pounds per 94 pound sack of cement when using regular sand, and about 55 to 165 pounds per sack when using light weight aggregates. The amount of water employed in the cementitious compositions of this invention has been found to be substantially less than would be required to hydrate and cure conventional concrete.

Other typical concrete compositions employed in the practice of this invention are admixtures in the proportion of about 125 to 300, and more preferably, about 125 to 175 pounds of aggregate per 94 pound sack of cement, sufficient water to harden the cement, and about ¼ to 3 gallons of epoxy resin per 94 pound sack of cement. Water in the amount of 4½ to 5 gallons per sack of cement is usually sufficient to obtain maximum strength on curing. However, in any case, the water content is adjusted to obtain a wet cement mix of the proper consistency. Thus, a typical cement composition useful in the constructions of this invention is as follows:

| | |
|---|---|
| Hydraulic cement | 94 pounds |
| Aggregate | 125 to 175 pounds |
| Water | 4½ to 5 gallons |
| Epoxy Resin | ¼ to 3 gallons |

A water reducing additive consisting principally of an admixture of hydroxylated polymers, calcium lignosulfonate, and an organic accelerator optionally can be added to the wet cement mixture. A suitable water reducing agent is marketed by Master Builders under the trademark Pozzolith 300-N. The liquid water reducing additive is employed in small amounts, such as in the proportion of about 1 to 6 fluid ounces per 94 pound sack of cement, and preferably in the proportion of about 2 to 4 fluid ounces per sack of cement.

The tensile and flexural strengths of the constructions of this invention can be further improved by dispersing short pieces of chopped glass fibers through the epoxy resin-containing concrete. The glass fibers are saturated with epoxy resin and incorporated into the wet cement along with the epoxy resin in the proportion of about 0.1 to 1 pound of glass fiber per 94 pound sack of cement. It has been found that fibers having lengths longer than about ½ inch form into balls or wads resulting in poor distribution of the epoxy resin within the wet cement mixture. Accordingly, it is preferred that the glass fibers have lengths of from about ⅛ inch to about ½ inch, with a length of about ¼ inch being preferred.

The fiber reinforcing material for the epoxy resin layer can be metal, plastic, cloth, or glass fiber in the form of matting, woven material, or short lengths of chopped fibers. Other fibers that can be employed are sisal, hemp, cotton, nylon, rayon, polyethylene terephthalate (Dacron), acrylic fibers (Orlon), and other synthetic and natural fibers. Included within the woven materials are metal, plastic, cloth, or glass screen or mesh. A preferred fiber reinforcing material that imparts superior strength to the ultimate structure is woven glass fiber roving. Glass fiber roving is a woven-type material in which bundles of glass fibers are woven in a basket-like weave. A particularly preferred reinforcing material is chopped glass fibers.

In preparing the epoxy resin-containing wet cement mixture, the hydraulic cement, aggregate, and water are admixed in conventional manner to obtain a relatively dry wet cement. Next, the epoxy resin is admixed into the wet cement mixture. All of the required water must be added prior to the addition of the epoxy resin as the addition of any substantial amount of water after the epoxy resin has been added causes separation of the resin resulting in improper hardening and reduced strengths.

The constructions of this invention are manufactured by applying the materials wet, or in their uncured form, to suitably shaped molds. The wet cement and epoxy resin are then hardened by curing, and the hardened member removed from the mold.

Figure 3:
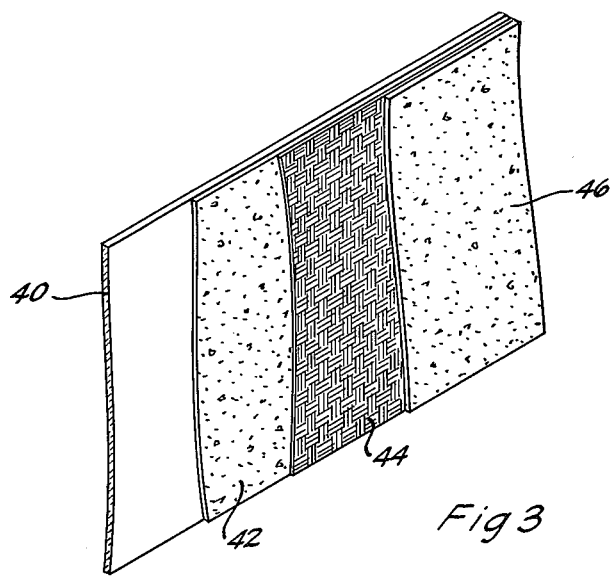
FIG. 3 is a perspective view illustrating the method of manufacturing the reinforced concrete constructions of this invention.

FIG. 3 illustrates the manufacture of a construction of this invention employing a mold 40. The mold can be coated with a suitable concrete form release, mold release or separating compound to facilitate removal of the completed structure from the mold. As illustrated in FIG. 3, a first relatively thin layer 42 of wet cement mixture is applied to the mold 40. The wet cement mixture can be readily applied by trowelling, or by blowing the mixture into the mold with a low pressure plaster gun. Next the layer 44 of epoxy resin saturated fibers is applied, and immediately thereafter, the layer 46 of wet cement mixture is applied. If desired, additional layers of epoxy saturated fibers and wet cement mixture can be applied to obtain a structure having the desired number of laminations. The final layer of wet cement mixture can be finished in any conventional manner to provide the desired finish, such as by trowelling, floating, rubber floating, brooming, and the like.

The fiber-reinforced epoxy resin layer can be formed by pre-saturating the fibers with epoxy resin, and applying the epoxy resin saturated fibers to the previously applied layer of wet cement mixture. Alternatively, fiber reinforcing material can be applied to the previously applied layer of epoxy resin-containing concrete, and the epoxy resin then applied by brushing, rolling or spraying.

In a preferred method of constructing the reinforced concrete structures of this invention, a first layer of wet cement mixture is applied to the mold, and epoxy resin applied directly to the surface of this layer of cement. Next, a layer of epoxy resin-saturated, woven glass fiber roving is applied, and additional epoxy resin applied to this layer to obtain a layer of fiber reinforcing material heavily saturated with the resin. Next, a second layer of wet cement mixture is applied. As before, additional layers of epoxy resin-saturated fibers and wet cement mixture can be applied, if desired.

In another preferred method for forming the constructions of this invention, the fiber-reinforced epoxy resin layer is applied by a chopper gun that simultaneously blows chopped glass fibers and sprays the epoxy resin onto the surface of the previously applied cement layer.

After the wet cement mixture and epoxy resin have set sufficiently that the structure has sufficient strength to be handled, the structure can be removed from the mold. Water or air under pressure can be injected between the concrete structure and the mold to free the structure from the mold. The water or air can be injected throuogh a suitable hose connection in the mold.

The laminated concrete constructions of this invention can have a wide variety of shapes and sizes depending upon the ultimate use of the construction. These constructions can be in the form of sheets, panels, posts, beams, girders, structural shapes, cylindrical or other shaped enclosed vessels, pipes, closed or open conduits, and the like. Also, the constructions can be in the form of urns, vases, containers, large bowls, dishes, statutes, and similar art of utilitarian objects, and constructions having unusual shapes can be easily formed. The cementitious constructions are further useful in fabricating plumbing fixtures, such as sinks, lavatory basins, laundry tubs, water closets, urinals, bathtubs and stall shower and bathtub enclosures. Also, these constructions are useful in fabricating boat and boat hulls, and counter and drainboard tops for bathrooms, kitchens, laboratories and industrial installations.

The exterior surfaces of the constructions of this invention can be left unfinished, or all or a portion of the surfaces can be provided with one or more coats of a suitable paint. A particularly durable finish is provided by coating the exterior surfaces of the concrete with epoxy paint.

The construction of this invention can be fabricated with thin, integrally bonded coatings of polyester or epoxy gel coat. A first relatively thin layer of gel coat is applied to the mold by spray or hand application. The gel coat can be clear or can be employed in a wide variety of colors. Next, a thin layer of fiber reinforcing material, such as chopped glass fibers, and epoxy resin is applied over the gel coat. The epoxy resin containing wet cement mixture is then applied and alternated with other layers of fiberreinforced epoxy resin and wet cement mixture. The gel coat layer ultimately forms the surface coating of the construction. The gel coat reproduces the mold surface exactly to form a mirror image of the mold on the surfaceof the construction. In this manner, any form of surface from a smooth, porcelain-like finish to a grained, extured textured can be obtained.

Tile, counter tops, panels, and like constructions formed of the cementitious material of this invention can be finished to have the appearance of simulated marble. In this embodiment of the invention, the constructions are preferably cast in forms. The marbleized surface layer consists of an admixture of about 2 parts by weight of finely ground calcium carbonate per part of clear polyester or epoxy gel coat. Pigments such as titanium dioxide, carbon black, and various paint pigments can be incorporated into the gel coat to provide a swirl or streak effect. The gel coat is placed in the form to a thickness of about 1/16 to ¼ inch, and preferably about 3/32 to ⅛ inch, and alternate layers of cementitious material and fiber-reinforced epoxy resin applied in the manner hereinabove described. The finished article constructed in this manner has an attractive marble-like appearance. In a modification of this embodiment, a clear polyester resin can first be applied to the form prior to placing the calcium carbonate resin mixture in the form. Constructions produced in this manner from a smooth form will have a smooth, mirror-like surface having the appearance of marble.

While various embodiments of the invention have been described, it will be obvious to those skilled in the art that it is not so limited, but is susceptible of various changes and modifications, which are considered within the spirit and scope of the invention as defined by the attached claims.

Having now described my invention, I claim:

1. A relatively thin, laminated construction comprising a plurality of alternate layers of epoxy resin-containing concrete consisting of a hardened mixture of hydraulic cement, aggregate, epoxy resin, and water in an amount sufficient to harden the cement interspaced with layer of fiber-reinforced epoxy resin integrally bonding together the adjacent layers of said epoxy resin-containing concrete.

2. The article defined in claim 1 wherein said mixture is in the proportion of about 125 to 300 pounds of aggregate, about ¼ to 3 gallons of epoxy resin, and sufficient water to harden the cement per 94 pound sack of cement.

3. The article defined in claim 1 wherein said mixture is in the proportion of about 1 to 3 cubic feet of aggregate, about ¼ to 3 gallons of epoxy resin, and about 4 to 6 gallons of water per 94 pound sack of cement.

4. The article defined in claim 1 wherein said fiber-reinforced epoxy resin is epoxy resin reinforced with a member selected from the group consisting of metal fibers, plastic fibers, and glass fibers.

5. The article defined in claim 1 wherein said construction is comprised of two layers of epoxy resin-containing concrete and a layer of fiber-reinforced epoxy resin therebetween.

6. The article defined in claim 1 wherein at least a portion of its surface is coated with epoxy resin.

7. The article defined in claim 1 having short pieces of glass fibers dispersed within said epoxy resin-containing concrete.

8. A construction comprising a relatively thin, laminated cementitious member comprised of a plurality of alternate layers of a hardened cementitious mixture consisting of hydraulic cement, aggregate, epoxy resin, and water in an amount sufficient to cure the cement; adjacent layers of said hardened cementitious mixture being interspaced with a layer of glass fiber-reinforced epoxy resin integrally bonded therewith.

9. The article defined in claim 8 wherein said hardened cementitious mixture is in the proportion of about 1 to 3 cubic feet of aggregate, about ¼ to 3 gallons of epoxy resin, and sufficient water to harden the cement per 94 pound sack of hydraulic cement.

10. The article defined in claim 8 wherein said construction is comprised of two layers of said hardened cementitious mixture and an integrally bonded layer of glass fiber-reinforced epoxy resin therebetween.

11. The article defined in claim 8 including an integrally bonded surface coat of polyester or epoxy gel coat.

12. A relatively thin construction comprised of a surface layer of polyester or epoxy gel coat and alternate integrally bonded layers of glass fiber-reinforced epoxy resin and a cementitious material consisting essentially of an admixture in the proportion of 1 to 3 cubic feet of aggregate; ¼ to 3 gallons of epoxy resin; 1 to 6 fluid ounces of a water reducing additive consisting essentially of an admixture of hydroxylated polymer, calcium liqnosulfonate and an organic accelerator; 0.1 to 1 pound of epoxy resin coated glass fibers on a length between about ⅛ to ½ inch; and sufficient water to harden the cement, all per 94 pound sack of hydraulic cement with the layer of glass-fiber reinforced epoxy resin interposed between the gel coat and the cementitious material integrally bonding the same together.

13. The article defined in claim 12 wherein said cementitious material is an admixture of about 2 cubic feet of aggregate, ¼ to 1 gallon of said epoxy resin, 2 to 4 fluid ounces of said water reducing additive, about 0.2 pound of glass fibers having lengths of about ¼ inch, and about 4 to 6 gallons of water per 94 pound sack of hydraulic cement.

14. The article defined in claim 1 including a surface layer of polyester or epoxy gel coat and a layer of glass fiber-reinforced epoxy resin integrally bonded between said surface layer and said layer of epoxy resin-containing concrete.

15. The article defined in claim 8 including a surface layer of polyester or epoxy gel coat and a layer of glass fiber-reinforced epoxy resin integrally bonded between said surface layer and said layer of hardened cementitious material.

* * * * *